United States Patent
Ikegashira et al.

(10) Patent No.: US 10,789,365 B2
(45) Date of Patent: Sep. 29, 2020

(54) CONTROL DEVICE AND CONTROL METHOD

(71) Applicant: Mitsubishi Electric Corporation, Tokyo (JP)

(72) Inventors: Toshiki Ikegashira, Tokyo (JP); Toshinori Matsui, Tokyo (JP); Koji Shimamura, Tokyo (JP); Hiroshi Okuyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 365 days.

(21) Appl. No.: 15/938,044

(22) Filed: Mar. 28, 2018

(65) Prior Publication Data

US 2019/0102557 A1 Apr. 4, 2019

(30) Foreign Application Priority Data

Oct. 4, 2017 (JP) ................................ 2017-194025

(51) Int. Cl.
*G06F 21/57* (2013.01)
*G06F 21/52* (2013.01)

(52) U.S. Cl.
CPC ............ *G06F 21/575* (2013.01); *G06F 21/52* (2013.01); *G06F 2221/2149* (2013.01)

(58) Field of Classification Search
CPC combination set(s) only.
See application file for complete search history.

(56) References Cited

U.S. PATENT DOCUMENTS

| 7,024,555 B2 * | 4/2006 | Kozuch | G06F 21/57 |
| | | | 713/168 |
| 8,181,040 B2 * | 5/2012 | Matsushima | G06F 21/74 |
| | | | 713/194 |

(Continued)

FOREIGN PATENT DOCUMENTS

| JP | 2012-32925 A | 2/2012 | |
| JP | 2017-33248 A | 2/2017 | |
| WO | WO 2017/022149 A1 * | 2/2017 | ............. G06F 21/57 |

OTHER PUBLICATIONS

Communication dated Sep. 4, 2018 issued by the Japanese Patent Office in counterpart application No. 2017-194025.

*Primary Examiner* — Christopher A Revak
(74) *Attorney, Agent, or Firm* — Sughrue Mion, PLLC; Richard C. Turner

(57) ABSTRACT

A first processing environment includes: a control processing unit configured to execute control processing on a control subject; a first storage area for storing data for controlling the control subject; and a verification determination unit. A second processing environment includes: a second storage area for storing an expected value; a verification value generation unit; and a verification execution unit. The verification value generation unit generates the verification value before the control processing is stopped. The verification execution unit executes comparison processing of comparing the expected value and the verification value before the control processing is activated. When the comparison result indicates a verification success, the verification determination unit executes determination processing of determining that the control processing is to be activated, and executes determination processing of determining that activation of the control processing is to be stopped when the comparison result indicates a verification failure.

7 Claims, 2 Drawing Sheets

(56) References Cited

U.S. PATENT DOCUMENTS

| | | | |
|---|---|---|---|
| 8,321,084 B2* | 11/2012 | Yamashita | H03M 7/46 |
| | | | 701/29.1 |
| 9,690,498 B2* | 6/2017 | Hutchison | G06F 21/53 |
| 10,565,130 B2* | 2/2020 | Chhabra | H04L 9/0897 |
| 2015/0242336 A1* | 8/2015 | Loreskar | G06F 21/72 |
| | | | 711/164 |
| 2019/0193748 A1* | 6/2019 | Fukumoto | B60W 40/105 |
| 2019/0229924 A1* | 7/2019 | Chhabra | H04L 9/3242 |

* cited by examiner

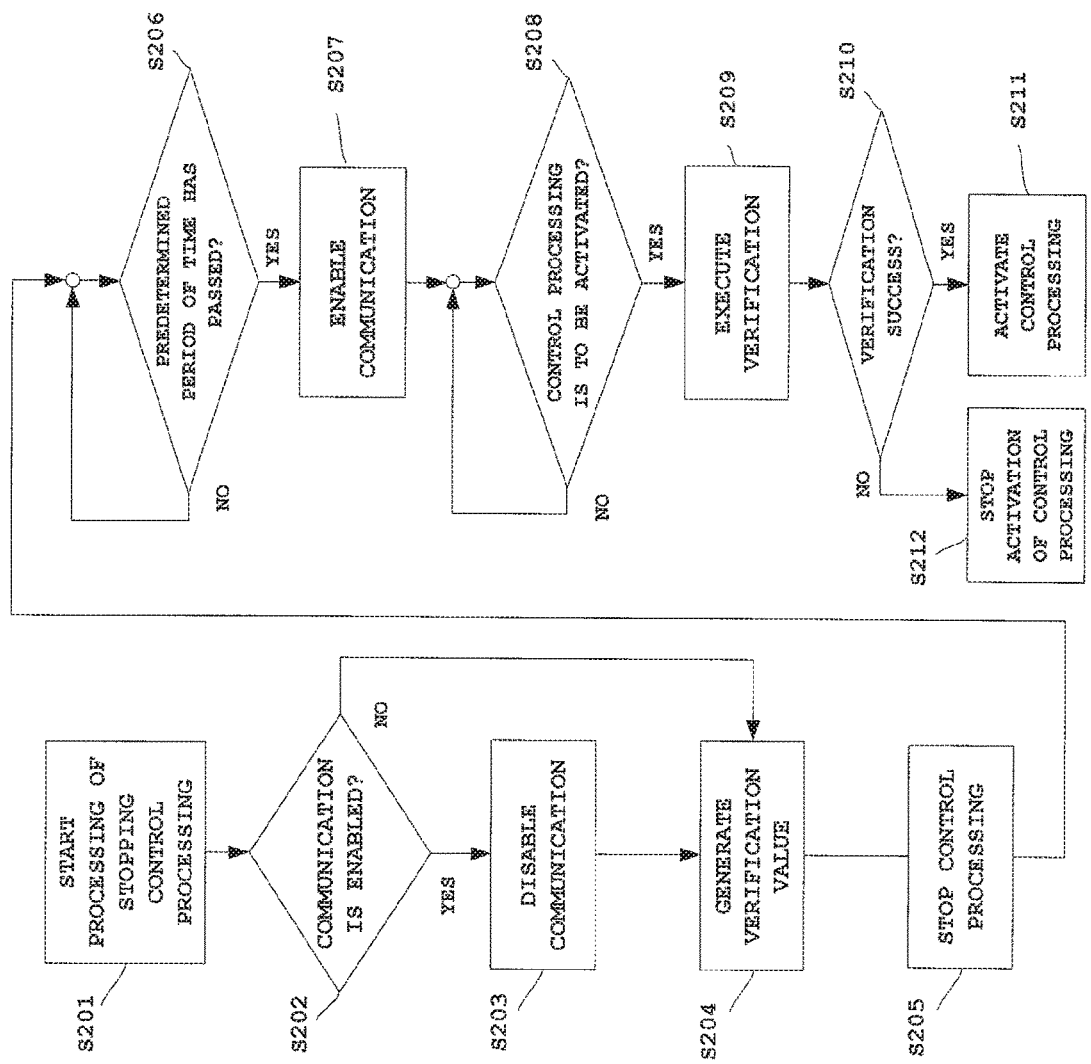

CONTROL DEVICE AND CONTROL METHOD

BACKGROUND OF THE INVENTION

1. Field of the Invention

The present invention relates to a control device, which requires high security strength and high-speed activation, and is connected to a communication line.

2. Description of the Related Art

Hitherto, for a control device installed in a vehicle, for example, an electronic control unit (ECU), there has been proposed a technology relating to a measure against tampering of data within the ECU (see, for example, Japanese Patent Application Laid-open No. 2017-33248).

In general, a plurality of ECUs are installed in the vehicle, and the ECUs are connected in a manner that allows communication thereamong. The ECUs are therefore susceptible to illicit invasion from the outside. When the ECU is illicitly invaded from the outside, and data within the ECU is thus tampered, the ECU may consequently be remotely operated illicitly from the outside.

Secure boot processing is known as a measure against tampering of data. The secure boot processing is a technology of verifying data through use of an encryption technology to detect tampering of the data. Through the detection of whether or not data within the ECU is tampered before the ECU is activated, it can be determined whether or not the ECU can be activated with high security strength.

However, there is a strict limitation on an ECU to be installed in a vehicle in terms of a period of time from the start to completion of activation of the ECU. High security strength and high-speed processing are therefore required for the secure boot processing to be executed when an ECU is activated. Further, a program for the secure boot processing itself may be tampered. High security strength against tampering is therefore required also for the secure boot processing itself.

In Japanese Patent Application Laid-open No. 2017-33248, an application program for which tampering is to be detected is selected from among application programs, to thereby shorten a period of time for the secure boot processing. In addition, according to Japanese Patent Application Laid-open No. 2017-33248, data to be used in verification is updated every time an event occurs, and thus the secure boot processing can also be activated with high security strength.

However, the related art has the following problems. In Japanese Patent Application Laid-open No. 2017-33248, in order to shorten the period of time for the secure boot processing, an application program for which tampering is to be detected needs to be selected from among application programs in advance by a system administrator. That is, tampering is not detected for an application program that is not selected from among application programs in advance. Therefore, when data of an application program that is not selected from among application programs in advance is illicitly tampered by an attacker, the tampering cannot be detected.

Moreover, in order to increase security strength against tampering of the secure boot processing itself, it is required to increase an amount of data to be used in the verification of the secure boot processing. In addition, it is required to increase an amount of data of an encryption key for generating a verification value.

When the amounts of a program and data for which tampering is to be detected are increased in this manner, it is difficult for an attacker, who invades a system from the outside to try to tamper the data, to decrypt the encrypted verification value. As a result, the security strength against tampering is increased.

Meanwhile, when the amounts of a program and data for which tampering is to be detected are increased, there is a problem in that a period of time required for the secure boot processing is increased. As a method of reducing a period of time of the secure boot processing, there has been known a method of using a hardware component capable of high-speed calculation, for example, a hardware security module (HSM). However, when the amount of data is large, there is a problem in that a period of time of the processing cannot be reduced sufficiently even in the case where the HSM is used.

SUMMARY OF THE INVENTION

The present invention has been made in order to solve the above-mentioned problems, and it is an object of the present invention to provide a control device and a control method, which are capable of securing high security strength and reducing a period of time of secure boot processing, which is executed when the control device is activated, as compared with the related art, even when amounts of a program and data for which tampering is to be detected are increased, or even when an amount of data to be used in the secure boot processing itself is increased.

According to one embodiment of the present invention, there is provided a control device including: a first processing environment; and a second processing environment, which is isolated from the first processing environment, the first processing environment including: a control processing unit configured to execute control processing on a control subject; a first storage area for storing data to be used by the control processing unit to control the control subject; and a verification determination unit configured to determine whether the control processing is to he executed, the second processing environment including: a second storage area for storing an expected value, which is generated in advance based on the data of the first storage area; a verification value generation unit configured to generate a verification value based on the data of the first storage area; and a verification execution unit configured to verify the data of the first storage area; the second storage area being set so as to be accessible only from the second processing environment, the verification value generation unit being configured to generate the verification value before the control processing executed by the control processing unit is stopped, and store the generated verification value in the second storage area, the verification execution unit being configured to execute comparison processing of comparing the expected value and the verification value before the control processing executed by the control processing unit is activated, and transmit a comparison result indicating a verification success or a verification failure to the verification determination unit included in the first processing environment, the verification determination unit being configured to: execute, when receiving from the verification execution unit the comparison result indicating the verification success, determination processing of determining that the control processing executed by the control processing unit is to be activated;

and execute, when receiving from the verification execution unit the comparison result indicating the verification failure, determination processing of determining that activation of the control processing executed by the control processing unit is to be stopped.

Further, according to one embodiment of the present invention, there is provided a control method for a control device, the control device including: a first processing environment; a second processing environment, which is isolated from the first processing environment; and a control processing unit configured to control a control subject through use of data stored under the first processing environment, the control method including: generating a verification value based on data of a first storage area included in the first processing environment; storing the verification value in a second storage area included in the second processing environment, the generating of the verification value and the storing of the verification value being executed before control processing executed by the control processing unit is stopped; executing comparison processing of comparing an expected value generated in advance based on the data of the first storage area and the verification value; executing, when a comparison result obtained by the comparison processing indicates a verification success, determination processing of determining that the control processing executed by the control processing unit is to be activated; and executing, when a comparison result obtained by the comparison processing indicates a verification failure, determination processing of determining that activation of the control processing executed by the control processing unit is to be stopped, the executing of the comparison processing, the executing of the determination processing of determining that the control processing executed by the control processing unit is to be activated, and the executing of the determination processing of determining that the activation of the control processing executed by the control processing unit is to be stopped being executed before the control processing executed by the control processing unit is activated.

According to the present invention, the verification value for secure boot processing (for tampering detection) is generated in advance before the control device is stopped, to thereby allow the secure boot processing to be executed through use of the verification value when the control device is activated. As a result, it is possible to obtain the control device and the control method, which are capable of securing high security strength and reducing a period of time of the secure boot processing, which is executed when the control device is activated, even when the amounts of the program and data for which tampering is to be detected are increased, or even when the amount of the data to be used in the secure boot processing itself is increased.

BRIEF DESCRIPTION OF THE DRAWINGS

FIG. 2 is a flowchart for illustrating processing of stopping and activating the control device according to the first embodiment of the present invention.

DESCRIPTION OF THE EMBODIMENTS

Figure 1:
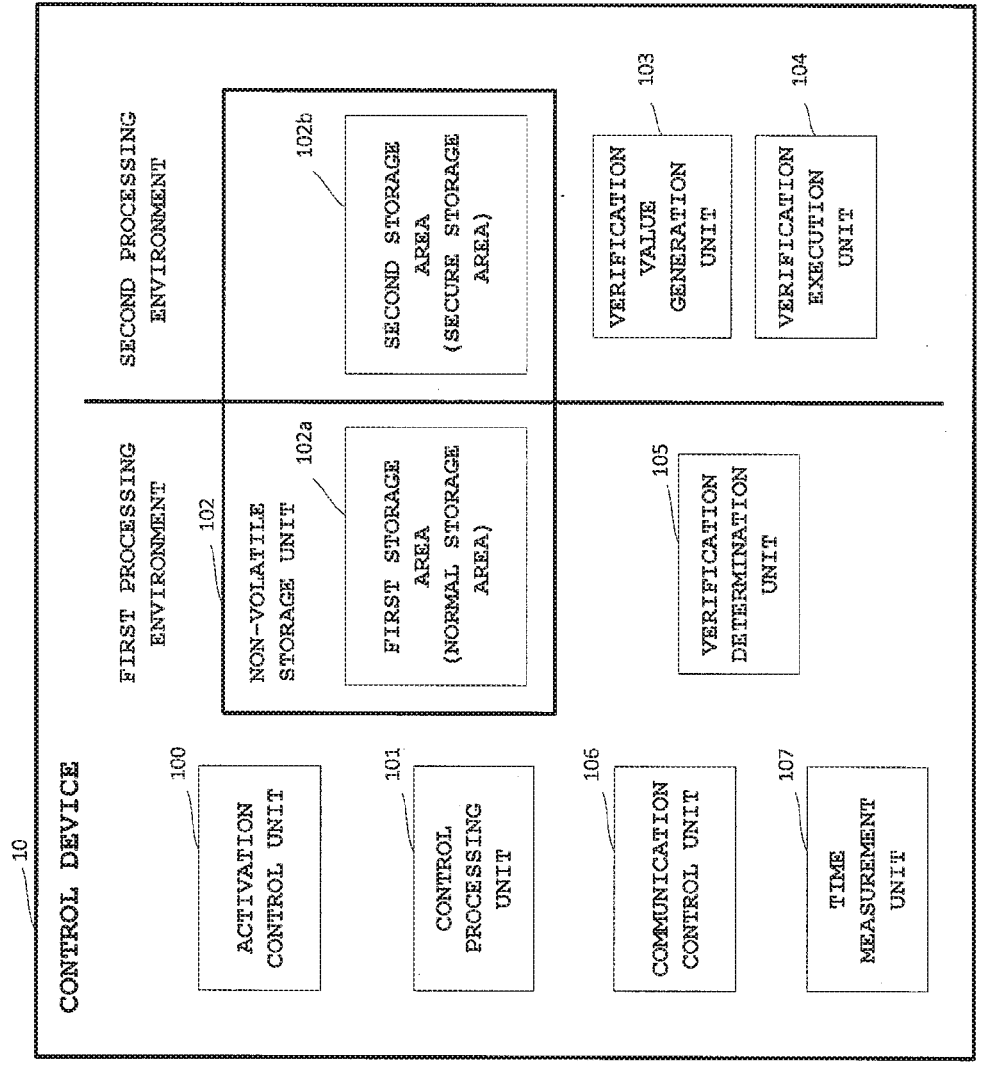
FIG. 1 is a functional block diagram of a control device according to a first embodiment of the present invention.

Now, a control device and a control method according to a preferred embodiment of the present invention are described with reference to the drawings. In the following, as a specific example of the control device, a detailed description is given of a case in which the control device is applied to an in-vehicle control device (ECU) configured to control a vehicle and an in-vehicle device.

First Embodiment

FIG. 1 is a functional block diagram for illustrating an in-vehicle control device (ECU) to which a control device according to a first embodiment of the present invention is applied. The in-vehicle control device according to the first embodiment (hereinafter referred to as "control device 10") includes an activation control unit 100, a control processing unit 101, a non-volatile storage unit 102, a verification value generation unit 103, a verification execution unit 104, a verification determination unit 105, a communication control unit 106, and a time measurement unit 107.

As illustrated in FIG. 1, the control device 10 includes a first processing environment and a second processing environment. The second processing environment is a processing environment that is isolated from the first processing environment in terms of hardware. For example, a hardware security module (HSM) can be used as the second processing environment.

The first processing environment includes the activation control unit 100, the control processing unit 101, a first storage area 102a within the non-volatile storage unit 102, the verification determination unit 105, the communication control unit 106, and the time measurement unit 107.

Meanwhile, the second processing environment includes a second storage area 102b within the non-volatile storage unit 102, the verification value generation unit 103, and the verification execution unit 104. Further, the second storage area 102b is set so as to be accessible only from the second processing environment.

The control device 10 is the in-vehicle control device configured to control a vehicle. The control device 10 is connected to another control device included in the vehicle via a communication line (not shown), for example, a controller area network (CAN).

The activation control unit 100 has a function of controlling activation and stopping of the control processing unit 101 of the control device 10. The activation control unit 100 also has a function of performing overall control of stopping processing and activation processing on the control processing unit 101.

As used herein, a state in which the control processing unit 101 is not activated refers to a state in which the control device 10 is in a sleep state or a power supply of the control device 10 is off.

The control processing unit 101 has a function of controlling a device to be controlled, which is installed in the vehicle. In FIG. 1, the device to be controlled is not shown. In the following description, the device to be controlled is simply referred to as "control subject". The control subject installed in the vehicle is an actuator or other such devices.

Specifically, the control processing unit 101 reads control program data corresponding to the control subject from the first storage area 102a of the non-volatile storage unit 102 and executes the read program, to thereby control the control subject.

The non-volatile storage unit 102 includes the first storage area 102a and the second storage area 102b. The first storage area 102a and the second storage area 102b are isolated from each other in terms of their physical or logical addresses.

The first storage area 102a is an area for storing the control program data to be used by the control processing unit 101 to execute the control processing. The first storage area 102a is an area in which data to be used by the control processing unit 101 at the time of normal operation is stored. Therefore, in the following, the first storage area 102a is sometimes referred to as "first storage area (normal storage area) 102a".

The second storage area 102b is an area for storing an expected value and a verification value to be used in secure boot processing. In the following, the second storage area 102b is sometimes referred to as "second storage area (secure storage area) 102b". The expected value is generated, for example, at a development stage of the control device 10 by the same calculation method as that of the verification value based on the data of the first storage area (normal storage area) 102a.

The data stored in the first storage area (normal storage area) 102a is, as described above, the program data to be used by the control processing unit 101 to execute the control processing. Therefore, when the data stored in the first storage area (normal storage area) 102a is tampered illicitly, a serious problem may occur in the operation of the control subject and the control of the entire vehicle.

The verification value generation unit 103 provided in the second processing environment has a function of generating the verification value to be used in the secure boot processing based on the data stored in the first storage area (normal storage area) 102a and used at the time of normal operation. As the verification value, for example, a message authentication code (MAC), a cyclic redundancy check (CRC), or a hash value may be used.

The verification execution unit 104 provided in the second processing environment verifies whether or not the expected value stored in the second storage area and the verification value generated by the verification value generation unit 103 based on the data of the first storage area (normal storage area) 102a match.

The verification determination unit 105 provided in the first processing environment determines whether or not to allow the control processing unit 101 to control processing for the control subject based on a verification result obtained by the verification execution unit 104.

When the verification result obtained by the verification execution unit 104 indicates that the expected value and the verification value match, the verification determination unit 105 determines that the data of the first storage area (normal storage area) 102a is not tampered. This verification determination result is hereinafter referred to as "verification success".

In addition, when the verification result indicates that the expected value and the verification value do not match, the verification determination unit 105 determines that the data of the first storage area (normal storage area) 102a is tampered. This verification determination result is hereinafter referred to as "verification failure".

The verification determination result is output from the verification determination unit 105 to the activation control unit 100. Based on the verification determination result output from the verification determination unit 105, the activation control unit 100 activates the control processing unit 101 when the verification determination result is "verification success", and stops the activation of the control processing unit 101 when the verification determination result is "verification failure".

In the above description, when the activation of the control processing unit 101 is stopped, execution of all the functions of the control processing unit 101 is stopped. However, the stopping processing of the first embodiment is not limited thereto. For example, the control processing unit 101 may be activated under a state in which execution of a part of the functions of the control processing unit 101 is limited.

The communication control unit 106 is connected to other devices installed in the vehicle via the communication line (not shown). The communication control unit 106 has a function of enabling or disabling a communication function between the control device 10 and external devices based on output from the activation control unit 100.

The time measurement unit 107 has a clock function of notifying the activation control unit 100 and the communication control unit 106 that a predetermined time point has been reached, or a timer function of notifying those units that a predetermined period of time has passed since a given time point.

The activation control unit 100 and the time measurement unit 107 are configured so as to be capable of being continuously activated even when the control device 10 is in a sleep state or a power-off state. For example, the activation control unit 100 and the time measurement unit 107 are configured so as to be continuously supplied with power from a battery or a battery power supply installed in the vehicle even when the control device 10 is in a sleep state or a power-off state.

Next, processing to be executed at the time of stopping and activation of the control processing unit 101 is described in detail with reference to FIG. 2. FIG. 2 is a flowchart for illustrating a flow of the processing to be executed at the time of stopping and activation of the control processing unit 101 in the first embodiment of the present invention.

In Step S201, the activation control unit 100 starts processing of stopping the control processing unit 101. The processing of stopping the control processing unit 101 is set so as to be automatically executed immediately before the control device 10 enters a sleep state or a power-off state.

Next, in Step S202, the activation control unit 100 inquires the communication control unit 106 of a current communication state. The communication control unit 106 confirms whether or not communication between the control device 10 and the external devices is enabled, and outputs a result of the confirmation to the activation control unit 100.

Next, when it is confirmed in Step S202 that the communication is disabled (S202: NO), the activation control unit 100 advances the processing to Step S204. Meanwhile, when it is confirmed in Step S202 that the communication is enabled (S202: YES), the activation control unit 100 advances the processing to Step S203.

In Step S203, the activation control unit 100 outputs an instruction to disable the communication to the communication control unit 106. After confirming that the communication is disabled by the communication control unit 106, the activation control unit 100 advances the processing to Step S204.

In Step S204, the activation control unit 100 outputs an instruction to generate a verification value to the verification value generation unit 103 within the second processing environment.

The verification value generation unit 103 reads, from the first storage area (normal storage area) 102a within the first processing environment of the non-volatile storage unit 102, data to be used in verification in the secure boot processing, and generates the verification value based on the read data. The verification value generation unit 103 stores the generated verification value in the second storage area (secure storage area) 102b.

For example, when the verification value is a message authentication code (MAC), and the second processing environment is a hardware security module (HSM), the verification value generation unit 103 generates a verification value MAC. The verification value generation unit 103 stores the generated verification value MAC in the second storage area (secure storage area) 102b.

As described above, before stopping the control processing, the control device 10 according to the first embodiment disables the communication function in Step S203, and then generates in advance the verification value to be used in the secure boot processing (tampering detection processing) in Step S204.

Next, in Step S205, the activation control unit 100 stops the operation of the control processing executed by the control processing unit 101. After the operation of the control processing unit 101 is stopped, the control device 10 enters a sleep state or a power-off state. In this case, the activation control unit 100 and the time measurement unit 107 are set so to be continuously activated even when the control device 10 enters a sleep state or a power-off state.

After the above-mentioned processing, the processing of stopping the control processing unit 101 is finished. At this stage, the verification value to be used in the secure boot processing is already generated and stored in the second storage area 102b.

Next, processing of activating the control processing unit 101 is described.

In Step S206, the time measurement unit 107 notifies, as an activation instruction, the activation control unit 100 that a predetermined time point to activate the control processing to be executed by the control processing unit 101 is reached. The predetermined time point in this case is, for example, a time point immediately before (e.g., one hour before) a driver routinely starts an engine of the vehicle. As another example, the driver may be allowed to select and set a time point as the predetermined time point.

Further, instead of the predetermined time point, the time measurement unit 107 may notify the activation control unit 100 of the activation instruction when a predetermined period of time (e.g., 1 hour to 12 hours) has passed since a given time point. In this case, the given time point may be set to, for example, a time point at which the engine is stopped or a time point at which the control device 10 enters a sleep state or a power-off state. As another example, the driver may be allowed to select and set a period of time as the predetermined period of time.

Next, in Step S207, the activation control unit 100 cancels a sleep state or a power-off state of the control device 10. As a result, the control device 10 enters an activated state.

Further, in Step S207, the activation control unit 100 outputs an instruction to enable the communication function to the communication control unit 106. The communication control unit 106 changes, based on the output from the activation control unit 100, the communication function between the control device 10 and the outside from a disabled state to an enabled state.

Next, in Step S208, the activation control unit 100 determines whether or not a request to activate the control processing is issued to the control device 10 from the external device via the communication line and the communication control unit 106. Then, when the request to activate the control processing is issued (S208: YES), the activation control unit 100 starts processing of activating the control processing unit 101.

Meanwhile, when there is no request to activate the control processing in Step S208 (S208: NO), the activation control unit 100 does not execute the processing of activating the control processing unit 101. The request to activate the control processing issued from the external device in this case is, for example, an activation request output from an ECU other than the control device 10 via the CAN communication.

Next, the processing of activating the control processing unit 101 is described. In Step S206, the activation control unit 100 requested to activate the control processing outputs an instruction to execute verification to the verification execution unit 104 within the second processing environment.

In Step S209, the verification execution unit 104 reads the verification value and the expected value from the second storage area (secure storage area) 102b, and determines whether or not the verification value and the expected value match. The verification value in this case is a verification value stored in the second storage area (secure storage area) 102b in Step S204 before the control processing is stopped in Step S205. The comparison result is output from the verification execution unit 104 within the second processing environment to the verification determination unit 105 within the first processing environment.

In Step S210, the verification determination unit 105 determines whether or not the data of the first storage area (normal storage area) 102a is tampered based on the comparison result. The verification determination unit 105 outputs a result of the verification determination to the activation control unit 100.

Specifically, when the expected value and the verification value match in the comparison result, the verification determination unit 105 determines that the data of the first storage area (normal storage area) 102a is not tampered, and determines the verification success as a result the verification determination (S210: YES). Meanwhile, when the expected value and the verification value do not match in the comparison result, the verification determination unit 105 determines that the data of the first storage area (normal storage area) 102a is tampered, and determines the verification failure as a result of the verification determination (S210: NO). The result of the verification determination is output from the verification determination unit 105 to the activation control unit 100.

The activation control unit 100 controls whether or not to activate the control processing unit 101 based on the result of the verification determination. When the verification determination is a success (S210: YES), the activation control unit 100 activates the control processing unit 101 (S211). The activated control processing unit 101 starts controlling the control subject.

Meanwhile, when the verification determination is a failure (S210: NO), the activation control unit 100 stops the activation of the control processing unit 101 (S212). With this configuration, it is possible to prevent the control processing unit 101 from controlling the control subject based on the tampered data.

In the above description, the verification determination unit 105 executes the verification determination in Step S210 in two levels of a success and a failure. Further, when the activation of the control processing unit 101 is stopped, execution of all of the functions of the control processing unit 101 is stopped. However, the first embodiment is not limited to such processing.

For example, as the levels of the verification determination based on the verification result, two levels of a verification success and a verification partial failure, or three levels of a verification success, a verification partial failure, and a verification failure may be used. Then, when it is determined that the verification result is a verification partial failure, for example, the activation control unit 100 may activate the control processing unit 101 under a state in which execution of a part of the functions of the control processing unit 101 corresponding to a part of data or programs determined as the verification failure is limited.

Specifically, as described below, it is conceivable that verification is executed for each control program data, and then the activation control unit 100 activates the control processing unit 101 by imposing such a limitation that control processing corresponding to control program data determined as the verification success is executed and that control processing corresponding to control program data determined as the verification failure is not executed.

A case is assumed in which a plurality of pieces of control program data corresponding to a plurality of control subjects or a plurality of control processing procedures are stored in the first storage area 102a. In this case, the verification value generation unit 103 generates a plurality of verification values corresponding to the plurality of pieces of control program data, respectively.

Subsequently, the verification execution unit 104 compares the plurality of verification values corresponding to the plurality of pieces of control program data, respectively, and expected values stored in advance in the second storage area 102b in association with the plurality of verification values, respectively. A plurality of comparison results thus obtained are output from the verification execution unit 104 to the verification determination unit 105.

Based on the plurality of comparison results output from the verification execution unit 104, the verification determination unit 105 determines, for each of the plurality of pieces of control program data, whether the verification result is a verification success or a verification failure. Then, when the expected values of the plurality of pieces of control program data and the corresponding verification values all match, the verification determination unit 105 determines that the data of the first storage area (normal storage area) 102a is not tampered, and determines a verification success as a result of the verification determination. Meanwhile, when the expected values of the plurality of pieces of control program data and the corresponding verification values do not partially match, the verification determination unit 105 determines that the data of the first storage area (normal storage area) 102a is partially tampered, and determines a verification partial failure as a result of the verification determination.

Subsequently, the verification determination unit 105 designates control processing corresponding to control program data determined as a verification success as control processing that is allowed to be executed, and designates control processing corresponding to control program data determined as a verification failure as control processing that is not allowed to be executed. The activation control unit 100 activates the control processing unit 101 so that the control processing unit 101 can execute only control processing designated by the verification determination unit 105 as control processing that is allowed to be executed. In this manner, the control processing unit 101 can be activated so that the control processing unit 101 cannot execute control processing corresponding to program data determined as a verification failure.

In the first embodiment described above, the case is described in which the control device according to the present invention is used as the in-vehicle control device. However, the control device according to the present invention is not limited thereto. The control device according to the present invention is applicable to, for example, any control device requiring high security strength and high-speed activation and connected to a communication line.

According to the first embodiment of the present invention described above, the following effects can be obtained for the secure boot processing performed in order to verify whether or not data to be used in control processing is tampered.

In the related-art control device, the verification value to be used in the secure boot processing is generated before the control processing is activated. In contrast, the control device according to the first embodiment is configured to generate the verification value to be used in the secure boot processing before the control processing is stopped, and to perform the secure boot processing through use of the verification value generated in advance before the control processing is activated.

With this configuration, a period of time of the secure boot processing performed before the control processing is activated can be shortened compared with the related art.

Further, by thus generating the verification value to be used in the secure boot processing in advance not before the activation of the control device, in which there is little spare time, but before the stop of the control device, a sufficient amount of data of an encryption key for generating the verification value can be secured. As a result, reliability of the secure boot processing can be enhanced.

Further, the control device according to the first embodiment includes the first processing environment and the second processing environment isolated from the first processing environment, and is configured to generate the verification value to be used in the secure boot processing within the second processing environment, store the verification value, and execute the verification with the secure boot processing. In addition, the second storage area in which the verification value is stored is set so as to be accessible only from the second processing environment. With this configuration, the security strength and reliability of the secure boot processing itself can be enhanced.

Further, the control device according to the first embodiment is configured to generate and store the verification value with the communication function of the control device being disabled. With this configuration, it is possible to prevent data from being tampered by an attack from the outside via the communication line.

Further, the control device according to the first embodiment includes therein the time measurement unit as means for allowing the communication state of the control device to return from the communication disabled state to the communication enabled state, and is configured to set the communication state of the control device to the communication enabled state based on a predetermined period of time measured by the time measurement unit. With this configuration, it is possible to allow the communication state of the control device to return from the communication disabled state to the communication enabled state without being attacked from the outside via the communication line.

What is claimed is:

1. A control device, comprising:
  a first processing environment; and
  a second processing environment, which is isolated from the first processing environment,
  the first processing environment including:
    a control processing unit configured to execute control processing on a control subject;
    a first storage area for storing data to be used by the control processing unit to control the control subject; and a verification determination unit configured to determine whether the control processing is to be executed, the second processing environment including:

a second storage area for storing an expected value, which is generated in advance based on the data of the first storage area;

a verification value generation unit configured to generate a verification value based on the data of the first storage area; and a verification execution unit configured to verify the data of the first storage area;

the second storage area being set so as to be accessible only from the second processing environment, the verification value generation unit being configured to generate the verification value before the control processing executed by the control processing unit is stopped, and store the generated verification value in the second storage area, the verification execution unit being configured to execute comparison processing of comparing the expected value and the verification value before the control processing executed by the control processing unit is activated, and transmit a comparison result indicating a verification success or a verification failure to the verification determination unit included in the first processing environment, the verification determination unit being configured to:

execute, when receiving from the verification execution unit the comparison result indicating the verification success, determination processing of determining that the control processing executed by the control processing unit is to be activated; and execute, when receiving from the verification execution unit the comparison result indicating the verification failure, determination processing of determining that activation of the control processing executed by the control processing unit is to be stopped.

2. A control device according to claim 1, wherein the first processing environment further includes:

an activation control unit configured to control activation and stopping of the control processing executed by the control processing unit; and a communication control unit having a communication function of communicating to and from an external device, and wherein the activation control unit:

disables the communication function of the communication control unit before stopping the control processing executed by the control processing unit; and subsequently stops the control processing executed by the control processing unit after causing the verification value generation unit to generate the verification value.

3. A control device according to claim 2, wherein the first processing environment further includes a time measurement unit that notifies, as an activation instruction, that a time point to activate the control processing executed by the control processing unit is reached, and wherein the activation control:

enables the communication function of the communication control unit when the activation instruction is received from the time measurement unit after the control processing executed by the control processing unit is stopped; and causes, when the communication control unit receives from the external device an activation request for activating the control processing executed by the control processing unit, the verification execution unit to execute the comparison processing and the verification determination unit to execute the determination processing before activating the control processing executed by the control processing unit.

4. A control device according to claim 1, wherein the verification execution unit compares a plurality of verification values generated by the verification value generation unit and a plurality of expected values stored in the second storage area, and transmits a plurality of comparison results each indicating a verification success or a verification failure for each of the plurality of verification values to the verification determination unit included in the first processing environment, and wherein the verification determination unit allows, based on the plurality of comparison results, a part of activation of the control processing executed by the control processing unit so that only control processing corresponding to a verification value for which the verification success is obtained is allowed to be executed.

5. A control device according to claims 2, wherein the verification execution unit compares a plurality of verification values generated by the verification value generation unit and a plurality of expected values stored in the second storage area, and transmits a plurality of comparison results each indicating a verification success or a verification failure for each of the plurality of verification values to the verification determination unit included in the first processing environment, and wherein the verification determination unit allows, based on the plurality of comparison results, a part of activation of the control processing executed by the control processing unit so that only control processing corresponding to a verification value for which the verification success is obtained is allowed to be executed.

6. A control device according to claim 3, wherein the verification execution unit compares a plurality of verification values generated by the verification value generation unit and a plurality of expected values stored in the second storage area, and transmits a plurality of comparison results each indicating a verification success or a verification failure for each of the plurality of verification values to the verification determination unit included in the first processing environment, and wherein the verification determination unit allows, based on the plurality of comparison results, a part of activation of the control processing executed by the control processing unit so that only control processing corresponding to a verification value for which the verification success is obtained is allowed to be executed.

7. A control method for a control device, the control device including:

a first processing environment;

a second processing environment, which is isolated from the first processing environment; and a control processing unit configured to control a control subject through use of data stored under the first processing environment, the control method comprising:

generating a verification value based on data of a first storage area included in the first processing environment;

storing the verification value in a second storage area included in the second processing environment, the generating of the verification value and the storing of the verification value being executed before control processing executed by the control processing unit is stopped;

executing comparison processing of comparing an expected value generated in advance based on the data of the first storage area and the verification value;

executing, when a comparison result obtained by the comparison processing indicates a verification success, determination processing of determining that the control processing executed by the control processing unit is to be activated; and executing, when a comparison result obtained by the comparison processing indicates a verification failure, determination processing of determining that activation of the control processing executed by the control processing unit is to be stopped, the executing of the comparison processing, the executing of the determination processing of determining that the control processing executed by the control processing unit is to be activated, and the executing of the determination processing of determining that the activation of the control processing executed by the control processing unit is to be stopped being executed before the control processing executed by the control processing unit is activated.

* * * * *